United States Patent
Yang et al.

(10) Patent No.: US 7,206,042 B2
(45) Date of Patent: Apr. 17, 2007

(54) COLOR FILTER SUBSTRATE AND LIQUID CRYSTAL DISPLAY APPARATUS HAVING THE SAME

(75) Inventors: Yong-Ho Yang, Seoul (KR); Dong-Ho Lee, Yongin-si (KR)

(73) Assignee: Samsung Electronics Co. Ltd., Suwon-Si (KR)

(*) Notice: Subject to any disclaimer, the term of this patent is extended or adjusted under 35 U.S.C. 154(b) by 211 days.

(21) Appl. No.: 10/795,515

(22) Filed: Mar. 9, 2004

(65) Prior Publication Data
US 2005/0024560 A1    Feb. 3, 2005

(30) Foreign Application Priority Data
Jul. 31, 2003    (KR)    .................. 10-2003-0053263

(51) Int. Cl.
*G02F 1/1335*    (2006.01)
*G09G 3/35*    (2006.01)

(52) U.S. Cl. ................. 349/106; 349/113; 349/114; 345/88

(58) Field of Classification Search ............... 349/106, 349/114, 113; 345/88
See application file for complete search history.

(56) References Cited

U.S. PATENT DOCUMENTS

| | | | |
|---|---|---|---|
| 6,122,027 A * | 9/2000 | Ogawa et al. | 349/113 |
| 6,322,936 B1 * | 11/2001 | Nishikawa et al. | 430/7 |
| 2002/0101552 A1 * | 8/2002 | Yi et al. | 349/106 |
| 2003/0007112 A1 * | 1/2003 | Matsushita | 349/106 |
| 2003/0063240 A1 * | 4/2003 | Takizawa | 349/106 |
| 2003/0218707 A1 * | 11/2003 | Jeong | 349/113 |

* cited by examiner

*Primary Examiner*—David Nelms
*Assistant Examiner*—Hoan Nguyen
(74) *Attorney, Agent, or Firm*—F. Chau & Associates, LLC

(57) ABSTRACT

The LCD apparatus having a color filter substrate including a first area and a second area adjacent to the first area. The color filter substrate includes a plurality of color pixels having different colors with respect to each other. The color pixels have an element formed thereon to partially expose the substrate. A transmission electrode is formed on the color filter and on the substrate exposed through the element. At least two color pixels of the color pixels have different sizes from each other. Thus, the LCD apparatus has improved display properties.

13 Claims, 6 Drawing Sheets

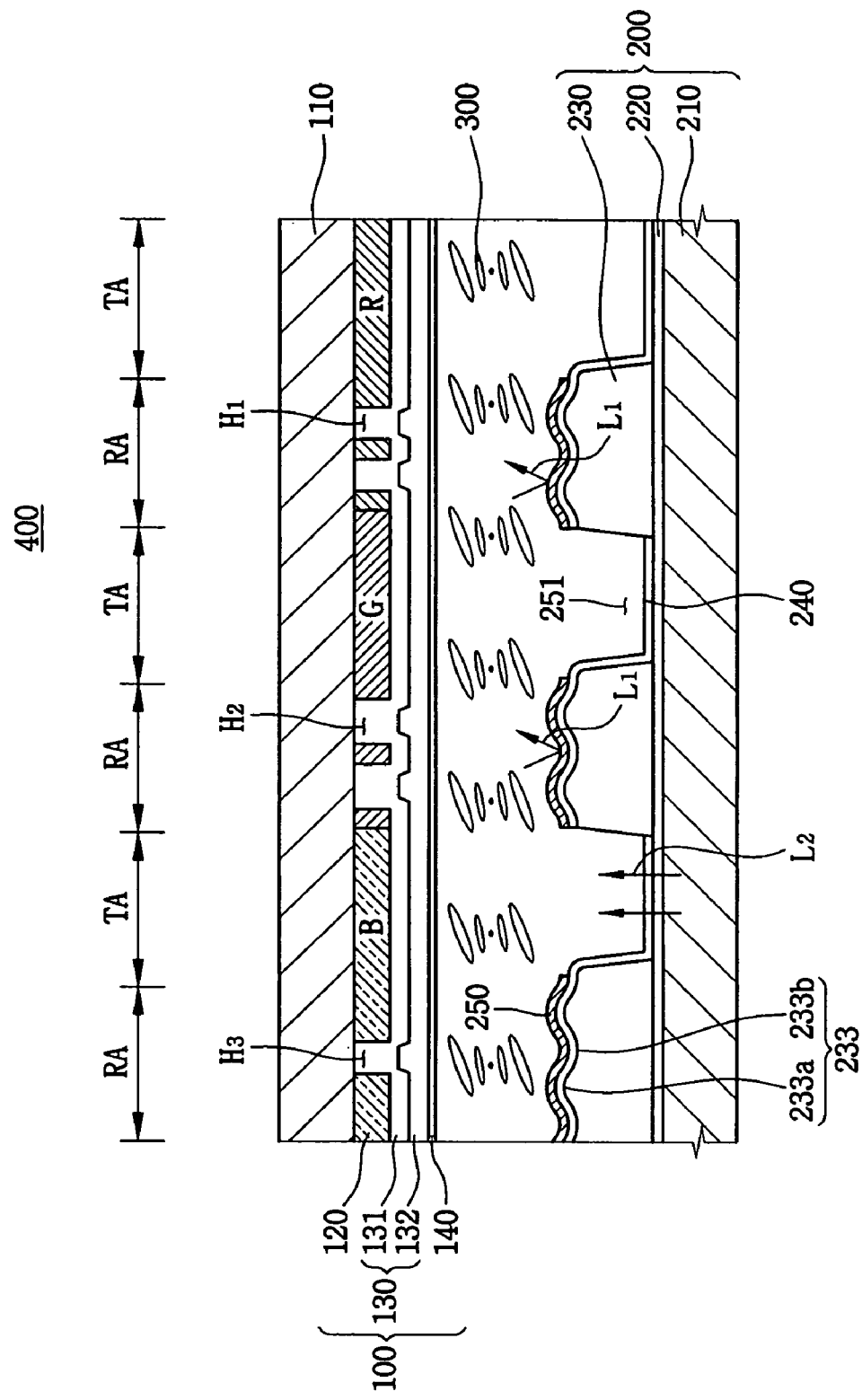

COLOR FILTER SUBSTRATE AND LIQUID CRYSTAL DISPLAY APPARATUS HAVING THE SAME

This application claims the benefit of Korean Patent Application No. 2003-53263, filed on Jul. 31, 2003, which is hereby incorporated by reference for all purposes as if fully set forth herein.

BACKGROUND OF THE INVENTION

1. Field of the Invention

The present invention relates to a color filter substrate and a liquid crystal display (LCD) apparatus having the same, and more particularly to a color filter substrate capable of improving display properties.

2. Description of the Related Art

A reflection-transmission type liquid crystal display (LCD) apparatus is capable of displaying an image in a reflection mode or in a transmission mode. For example, the image may be displayed in reflection mode when external light is sufficient to display the image and the image may be displayed in transmission mode when the external light is insufficient to display the image, for example, using generated internal light in the display of the image.

The reflection-transmission type LCD apparatus, generally, includes an LCD panel having an array substrate, a color filter substrate facing the array substrate, and liquid crystal material interposed between the array substrate and color filter substrate.

The array substrate includes a transmission electrode and a reflection electrode. The transmission electrode includes a reflection area on which the reflection electrode is formed and a transmission area on which the reflection electrode is not formed. The color filter substrate includes a color filter having red, green, and blue (RGB) color pixels and a common electrode coupled to the array substrate.

When the reflection-transmission type LCD apparatus operates in the reflection mode external light goes through a first pathway sequentially passing through the color filter, common electrode, liquid crystal, reflection electrode, liquid crystal, common electrode, and color filter. When the reflection-transmission type LCD apparatus operates in the transmission mode, the internal light goes through a second pathway sequentially passing through the pixel electrode, liquid crystal, common electrode, and color filter.

Color reproducibility of the displayed image in the reflection mode may be different from the color reproducibility of the displayed image in the transmission mode. This is due to external light in the reflection mode passing through the color filter twice and internal light in the transmission mode passes through the color filter only once. Also, different colorants may render each of the color pixels have different color visibility and brightness.

The difference of color visibility and color reproducibility among the reflection mode and the transmission mode deteriorate the display quality of the reflection-transmission type.

BRIEF SUMMARY OF THE INVENTION

Accordingly, the present invention is directed towards a color filter substrate and liquid crystal display apparatus having the same that substantially obviates one or more of the problems due to limitations and disadvantages of the related art.

The present invention enables reflection-transmission LCD apparatus to show improved display qualities.

The present invention also substantially minimizes differences in color visibility, brightness, and/or reproducibility between reflection mode and transmission mode.

Additional aspects of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention discloses a reflection-transmission LCD that reduces differences in color reproducibility between reflective mode operation and transmission mode operation, which comprises at least one element formed in a color filter layer to substantially minimize differences in the color reproducibility between the reflective mode operation and the transmission mode operation of the reflection-transmission LCD.

The present invention also discloses a reflection-transmission LCD, comprising a first substrate and a second substrate arranged opposite the first substrate. A red (R), green (G), and blue (B) color filter layer is formed on the first substrate. A planarization layer is formed on the first substrate and at least one hole is formed in the color filter layer to substantially minimize differences in color reproducibility between reflective mode operation and transmission mode operation.

The present invention discloses another embodiment of a reflection-transmission LCD, comprising a first substrate and a second substrate arranged opposite the first substrate. A red (R), green (G), and blue (B) color filter layer is formed on the first substrate, wherein at least one hole is formed in the color filter layer to substantially improve display quality of reflective mode operation and transmission mode operation. The reflection-transmission LCD comprises a planarization layer formed on the first substrate, wherein the planarization layer comprises a first insulating layer formed on the color filter layer to cover the at least one hole formed in the color filter layer and a transmission region and a reflection region, wherein the reflection region has a smaller cell gap than the transmission region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and constitute a part of this specification, illustrate embodiments of the invention and together with the description serve to explain the principles of the invention.

FIG. 8 shows a cross-sectional view of a reflection-transmission type LCD apparatus having the color filter substrate shown in FIG. 1.

DETAILED DESCRIPTION OF THE INVENTION

Reference will now be made in detail to embodiments of the present invention, examples of which are illustrated in the accompanying drawings.

Figure 1:
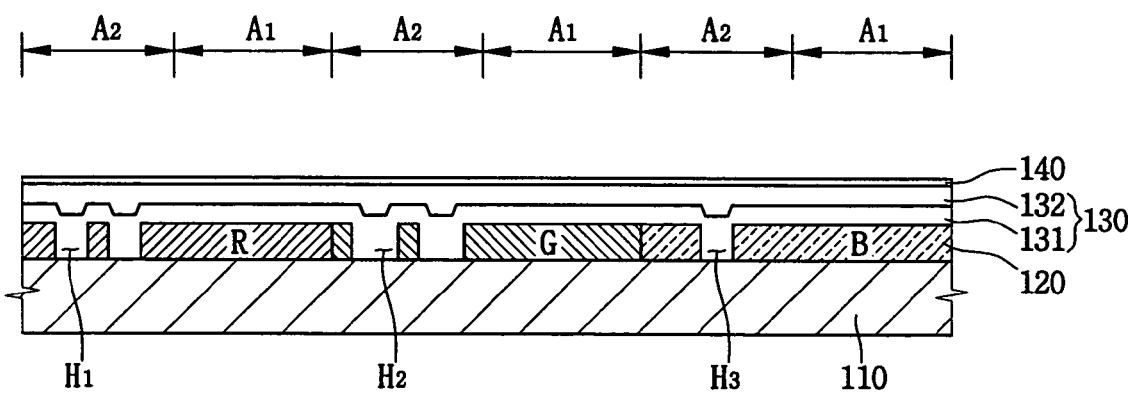
FIG. 1 shows a cross-sectional view of a color filter substrate according to an embodiment of the present invention.
Figure 2:
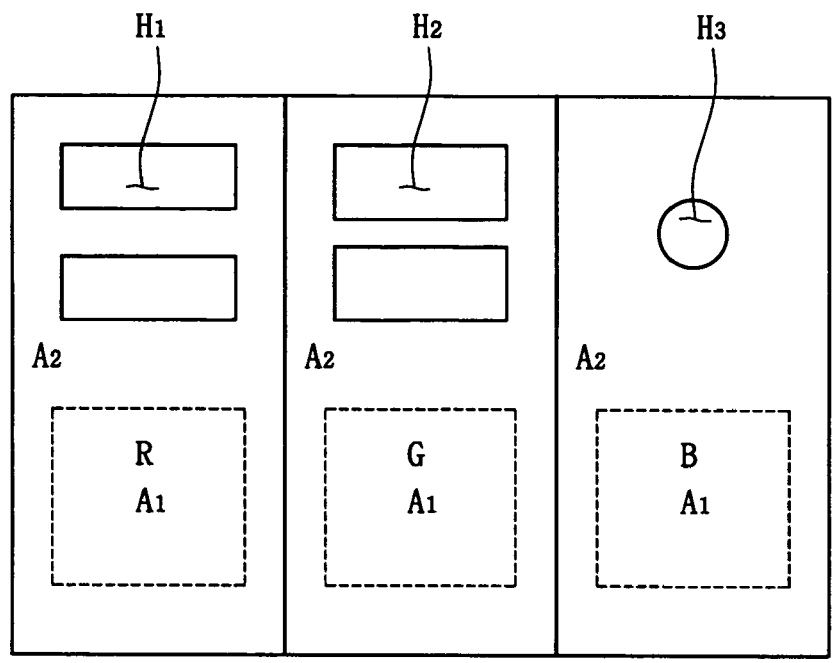
FIG. 2 shows a plan view of a color filter of FIG. 1.
Figure 3:
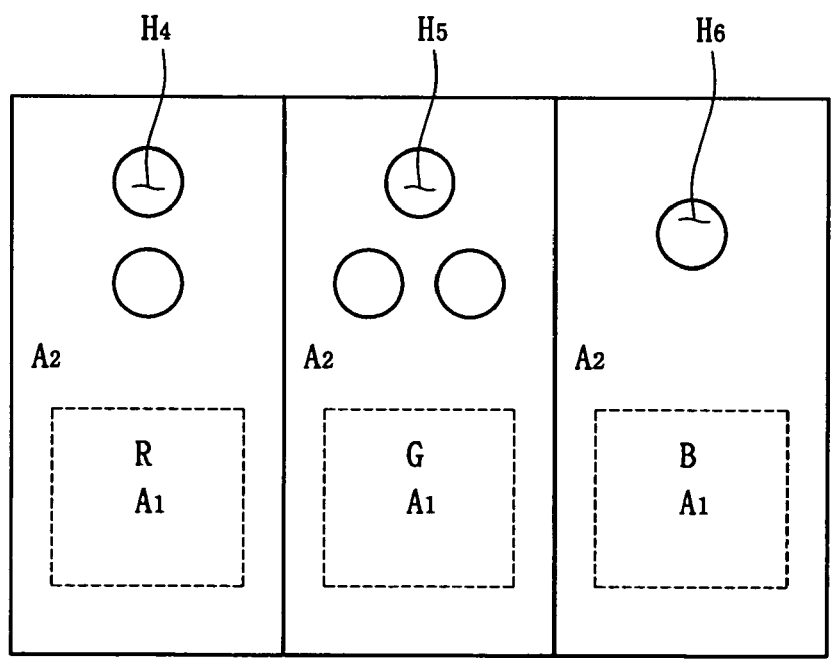
FIG. 3 shows a plan view of a color filter according to another exemplary embodiment of the present invention.

In FIGS. 1, 2 and 3, the color filter substrate 100 can reduce differences in color reproducibility and color visibility between the first area A1 and the second area A2 by forming holes at the R, G, and B color pixels.

Additionally, the differences in color reproducibility and color visibility between the first area A1 and the second area A2 may be reduced by adjusting the respective thickness of the R, G, and B color pixels.

More particularly, the R, G, and B color pixels corresponding to the first area A1 is thicker than the R, G and B color pixels of the second area A2. In this embodiment, the B color pixel is thicker than the R color pixel and the G color pixel is thinner than the R color pixel. This reduces the differences of the color reproducibility and visibility between the R, G, and B color pixels.

FIG. 1 shows a cross-sectional view of a color filter substrate according to an embodiment of the present invention. FIG. 2 shows a plan view of a color filter of FIG. 1.

Referring to FIG. 1, a color filter substrate 100 includes a substrate 100, a color filter 120 formed on the substrate 110, a planarization layer 130 formed on the color filter 120, and a common electrode 140 formed on the planarization layer 130. The color filter substrate 100 is divided into a first area A1 and a second area A2 adjacent to the first area A1.

A first light passing through the first area A1 sequentially goes through the common electrode 140, color filter 120 and substrate 110. A second light passes through the second area A2 sequentially goes through the substrate 110, color filter 120, common electrode 140, color filter 120 and substrate 110. The first light of the first area A1 passes through the color filter 120 only once. The second light of the second area A2 passes through the color filter 120 twice.

The color filter 120 includes a red color pixel (R color pixel), a green color pixel (G color pixel), and a blue color pixel (B color pixel).

A first hole H1 is formed at the second area A2 corresponding to the R color pixel so as to partially expose the substrate 110. A second hole H2 bigger than the first hole H1 is formed at the second area A2 corresponding to the G color pixel and also partially exposes the substrate 110. Additionally, the G color pixel is smaller than the R color pixel. A third hole H3 is formed at the second area A2 corresponding to the B color pixel and smaller than the first hole H1 and partially exposes the substrate 110. The B color pixel is bigger than the G color pixel and the R color pixel.

The R, G, and B color pixels of the first area A1 are entirely covered with respective color filter layer. Out of the R, G, and B color pixels of the second area A2 respective color filter layers are partially removed as the first, second and third holes H1, H2 and H3 are formed. This reduces differences in color reproducibility between the RGB color pixels formed on the first area A1 and the RGB color pixels formed on the second area A2.

In general, the R, G, and B color pixels have different color visibility and brightness. Among the R, G, and B color pixels, the color visibility and brightness of the B color pixel has a wavelength close to a visible ray. The B color is inferior to that of the R color pixel having a wavelength close to an infrared ray. The color visibility and brightness of the G color pixel has a wavelength close to an ultraviolet ray and is superior to the R color pixel having the wavelength close to the infrared ray.

TABLE 1

|    | R H1 | R x | R y | G H2 | G x | G y | B H3 | B x | B y | W x | W y |
|----|------|-----|-----|------|-----|-----|------|-----|-----|-----|-----|
| A2 | 0%   | 0.591 | 0.357 | 0%  | 0.289 | 0.562 | 0%  | 0.140 | 0.169 | 0.276 | 0.352 |
|    | 13%  | 0.51  | 0.325 | 21% | 0.3   | 0.465 | 6%  | 0.153 | 0.18  | 0.31  | 0.35  |
| A1 | 0%   | 0.516 | 0.336 | 0%  | 0.324 | 0.472 | 0%  | 0.149 | 0.161 | 0.304 | 0.335 |

As shown in Table 1, the R, G and B color pixels have x-y color coordinates different from each other at the first area A1 and the second area A2 when the first hole H1, the second hole H2 and the third hole H3 are not formed in the R, G, and B color pixels of the second area A2.

In this embodiment, in order to reduce the difference of the color visibility and brightness of the R, G, and B color pixels, the first hole H1, the second hole H2, and the third hole H3 of different sizes are respectively formed at each color pixels of R, G and B. The first hole H1 is about 13% in size of entire R color pixel. The second hole H2 is about 21% in size of an entire G color pixel. The third hole H3 is about 6% in size of an entire B color pixel.

The variation of the color coordinates of the G color pixel depending on the size is smaller than those of the R color pixel and the B color pixel, because the second hole H2 is bigger than the first hole H1 and the third hole H3.

The difference between the color visibility and brightness of the R, G, and B color pixels is reduced as the second hole H2 is bigger than the first hole H1 and the third hole H3 is smaller than the first hole H1. It is also because the G color pixel is smaller than the R color pixel and the B color pixel is greater than the R color pixel. The color visibility of the first area A1 is substantially equal to the second area A2 as the white color coordinate (0.304, 0.335) of the first area A1 is substantially equal to the white color coordinate (0.310, 0.350) of the second area A2.

Referring to FIG. 2, showing two first holes H1 formed at the R color pixel. Two second holes H2 are bigger than the first hole H1 are formed at the G color pixel. A third hole H3 smaller than the first hole H1 is formed at the B color pixel. Accordingly, each of the R, G, and B color pixels is different in size.

Even though the number of first holes H1 is equal to a number of the second holes H2, overall size of the G color pixel is smaller than the R color pixel because the first hole H1 is smaller than the second hole H2.

In FIGS. 1 and 2, the R, G, and B color pixels are different in size from each other. As another embodiment of the present invention, only one of the R, G, and B color pixels may be different in size from the other two color pixels. That is, the R color pixel may have substantially the same size as the G color pixel and the B color pixel may be smaller than the R color pixel. Optionally, the R color pixel may have substantially the same size as the B color pixels. The G color pixel may be bigger than the R color pixel.

The color filter substrate 100 further includes the planarization layer 130 for planarizing a step difference between the substrate 110 exposed through the first, second, and third holes H1, H2 and H3, respectively, and the color filter 120 adjacent to the first, second, and third holes H1, H2 and H3, respectively.

The planarization layer 130 includes a first insulating layer 131 and a second insulating layer 132. The first insulating layer 131 is formed on the substrate 110. The second insulating layer 132 is formed on the first insulating layer 131.

The step difference between the color filter 120 and substrate 110 is planarized by the first insulating layer 131 and then substantially and completely planarized by the second insulating layer 132 formed on the first insulating layer 131. In this embodiment, the first insulating layer 131 and second insulating layer 132 comprise a photosensitive organic insulating layer, for example, acrylic resin, or the like.

Also, the first insulating layer 131 may comprise an inorganic insulating layer, for example, silicon nitride (SiNx), silicon oxide (SiOx), or the like. The second insulating layer 132 may comprise an organic insulating layer.

The common electrode 140 is formed on the planarization layer 130. The common electrode 140 comprises a transparent conductive material, for example, indium tin oxide (ITO), indium zinc oxide (IZO), or the like.

FIG. 3 shows a plan view of a color filter according to another embodiment of the present invention.

Referring to FIG. 3, two first holes H4 are formed at the R color pixel, three second holes H5 are formed at the G color pixel, and a third hole H6 is formed at the B color pixel. The second hole H5 and the third hole H6 have substantially the same size as the first hole H4.

The R, G, and B color pixels of the second area A2 are different in sizes because the R, G, and B color pixels have a different number of holes from each other even though the first, second, and third holes H4, H5, and H6, respectively, have substantially the same size. In this embodiment, the G color pixel is smaller than the R color pixel and the B color pixel is bigger than the R color pixel.

Figure 4:
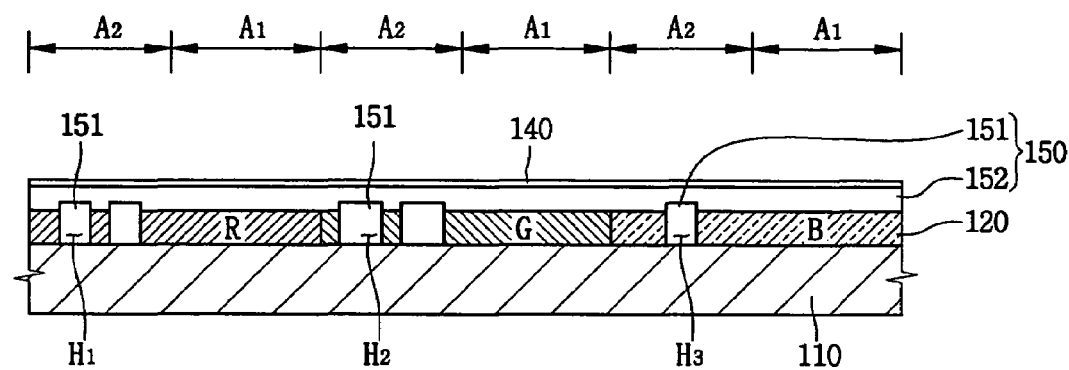
FIG. 4 shows a cross-sectional view of a color filter substrate according to another embodiment of the present invention.

FIG. 4 shows a cross-sectional view of a color filter substrate according to another embodiment of the present invention. In FIG. 4, the same reference numerals denote the same elements in FIG. 1 and the detailed descriptions of the same elements will not be repeated.

Referring to FIG. 4, a color filter substrate 100 includes a substrate 110, a color filter 120 formed on the substrate 110, a planarization layer formed on substrate 110 to cover the color filter 120, and a common electrode 140 formed on the planarization layer 150. The color filter substrate 100 includes a first area A1 and a second area A2 arranged adjacent to the first area A1.

The color filter 120 includes R, G, and B color pixels. A first hole H1 is formed at the second area A2 of the R color pixel and partially exposes the substrate 110. A second hole H2 bigger than the first hole H1 is formed at the second area A2 of the G color pixel and partially exposes the substrate 110. Additionally, the second hole renders the G color pixel smaller than the R color pixel in effective area. A third hole H3 smaller than the first hole H1 is formed at the second area A2 of the B color pixels and partially exposes the substrate 110. The third hole H3 renders the B color pixel bigger than the G and R color pixels.

The color filter substrate 100 further includes a planarization layer 150 for reducing a step difference between the substrate 110 and the color filter 120.

The planarization layer 150 comprises a first insulating layer 151 and a second insulating layer 152. The first insulating layer 151 is formed on the substrate 110 through areas exposed through the first, second, and third holes H1, H2 and H3, respectively. The second insulating layer 152 is formed on the first insulating layer 131 and on the color filter 120.

The step difference between the color filter 120 and substrate 110 is planarized with the first insulating layer 151. Additionally, the step difference is substantially and completely planarized with a second insulating layer 152 formed on the first insulating layer 151 and color filter 120. In this embodiment, the first insulating layer 151 and second insulating layer 152 comprise an organic insulating layer.

The common electrode 140 formed on the planarization layer 150 comprises a transparent conductive material, for example, indium tin oxide (ITO), indium zinc oxide (IZO), or the like.

Figure 5A:
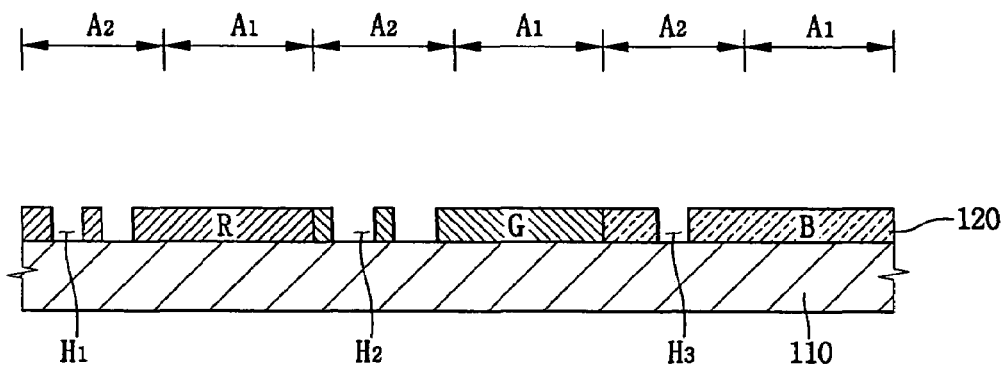
FIGS. 5A, 5B and 5C show views illustrating methods of fabricating the color filter substrate of FIG. 4.
Figure 5B:
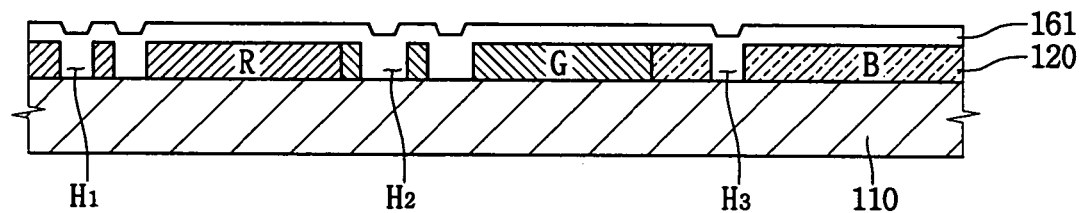
Figure 5C:
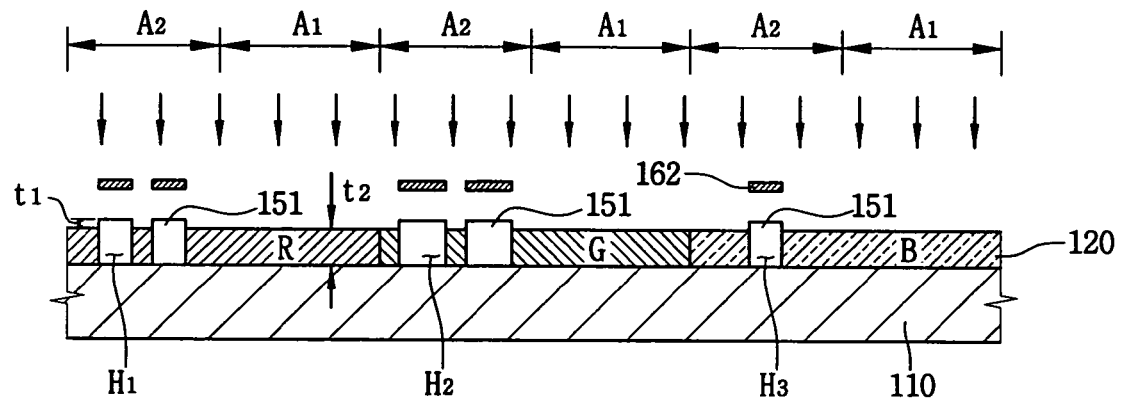

FIGS. 5A, 5B and 5C shows views of a method of fabricating the color filter substrate of FIG. 4.

Referring to FIG. 5A, the color filter 120 has R, G, and B color pixels formed on the substrate 110. The first, second, and third holes H1, H2 and H3, respectively, are formed at the R, G, and B color pixels, respectively, and these holes partially expose the substrate 110. More particularly, the R, G, and B color pixels corresponding to the second area A2 are partially removed in order to partially expose the substrate 110.

Referring to FIG. 5B, an organic insulating layer 161 is formed on the color filter 120 and on the substrate 110 that is exposed through the first, second, and third holes H1, H2 and H3, respectively. The organic insulating layer 161 has non-uniform surface due to the step difference between the substrate 110 and color filter 120.

Referring to FIG. 5C, a mask 162 is formed on the organic insulating layer 161 corresponding to the first, second, and third holes H1, H2, and H3. The organic insulating layer 161 may be successively exposed and developed. That is, the first insulating layer 151 is formed on the substrate 110 and may be exposed through the first, second, and third holes H1, H2 and H3, respectively.

As shown in FIG. 5C, the first insulating layer 151 is thicker than the color filter 120. A first step difference t1 between the color filter 120 and first insulating layer 151 is smaller than a second step difference t2 between the substrate 110 and color filter 120. The step difference between the substrate 110 and color filter 120 may be reduced as shown in FIG. 4 when the second insulating layer 152 is formed on the color filter 120 and first insulating layer 151.

Figure 6:
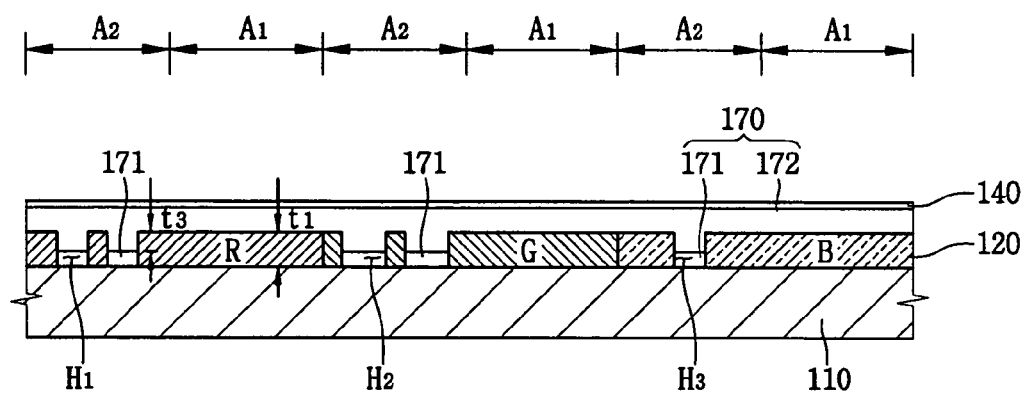
FIG. 6 shows a cross-sectional view of a color filter substrate according to another embodiment of the present invention.

FIG. 6 shows a cross-sectional view of a color filter substrate according to another embodiment of the present invention. In FIG. 6, a color filter substrate 100 includes a substrate 110, a color filter 120 formed on the substrate 110, a planarization layer 170, and a common electrode 140 formed on the planarization layer 170. The color filter substrate 100 includes a first area A1 and a second area A2 arranged adjacent to the first area A1.

The color filter 120 includes R, G, and B color pixels. A first hole H1 is formed at the second area A2 of the R color pixel and partially exposes the substrate 110. A second hole H2 bigger than the first hole H1 is formed at the second area A2 of the G color pixel and partially exposes the substrate 110. A third hole H3 smaller than the first hole H1 is formed at the second area A2 of the B color pixel and partially exposes the substrate 110.

The planarization layer 170 includes a first insulating layer 171 and a second insulating layer 172. The first insulating layer 171 is formed on the substrate 110 through the first, second, and third holes H1, H2, and H3, respectively. The second insulating layer 172 is formed on the first insulating layer 171 and color filter 120.

The step difference between the color filter 120 and substrate 110 is planarized with a first insulating layer 171. Additionally, the step difference is substantially and completely planarized with a second insulating layer 172 formed on the first insulating layer 171 and on the color filter 120.

In this embodiment, the first insulating layer 171 comprises an inorganic insulating layer. For example, the inorganic insulating layer may be silicon nitride (SiNx), silicon oxide (SiOx), or the like. The second insulating layer 172 comprises an organic insulating layer. The first insulating layer 171 is thinner than the color filter 120, additionally, the step difference t3 between the color filter 120 and first insulating layer 171 is smaller than the step difference t1 between the substrate 110 and color filter 120.

The second insulating layer 172 is formed on the first insulating layer 171 and color filter 120, thereby planarizing the step difference t3.

The common electrode 140 may include a transparent conductive electrode formed on the planarization layer 170. For example, the common electrode may be indium tin oxide (ITO), indium zinc oxide (IZO) and the like.

Figure 7:
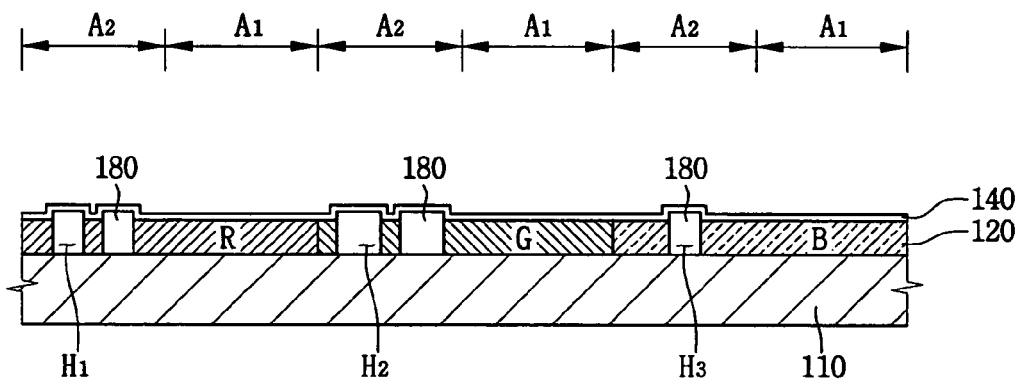
FIG. 7 shows a cross-sectional view of a color filter substrate according to another embodiment of the present invention.

FIG. 7 shows a cross-sectional view of a color filter substrate according to another embodiment of the present invention.

Referring to FIG. 7, a color filter substrate 100 includes a substrate 110, a color filter 120 formed on the substrate 110, a planarization layer 180, and a common electrode 140. The color filter substrate 100 has a first area A1 and a second area A2 arranged adjacent to the first area A1.

The color filter 120 includes R, G, and B color pixels. A first hole H1 is formed at the second area A2 of the R color pixel and partially exposes the substrate 110. A second hole H2 bigger than the first hole H1 is formed at the second area A2 of the G color pixel and partially exposes the substrate 110. A third hole H3 is formed at the second area A2 of the B color pixel and is smaller than the first hole H1 of the B color pixel and partially exposes the substrate 110.

The planarization layer 180 is formed on the substrate 110 through the first, second, and third holes H1, H2, and H3, respectively. The planarization layer 180 comprises an organic insulating layer and is thicker than the color filter 120. Although not shown in FIG. 7, the planarization layer 180 may include an inorganic insulating layer, so that the planarization layer 180 may be thinner than the color filter 120.

In this embodiment, a step difference between the color filter 120 and planarization layer 180 is smaller than a step difference between the substrate 110 and color filter 120.

In FIG. 7, the planarization layer 180 is thicker than the color filter 120. However, the planarization layer 180 may have substantially the same thickness as the color filter 120.

In FIGS. 1, 2, 3, 4, 5, 6 and 7, the planarization layer may comprise a plurality of layers. For example, the planarization layer may be a single layer, a double-layer, or a triple-layer. Also, the color filter substrate having the first, second, and third holes H1, H2, and H3, respectively, are formed at the R, G, and B color pixels, respectively described in above drawings may have one pixel between the R, G, and B color pixels.

FIG. 8 shows a cross-sectional view of LCD apparatus having the color filter substrate of FIG. 1.

Referring to FIG. 8, a reflection-transmission type LCD apparatus 400 includes an array substrate 200, a color filter substrate 100 combined with the array substrate 200, and a liquid crystal 300 interposed between the array substrate 200 and color filter substrate 100.

The array substrate 200 includes a first substrate 210, a gate insulating layer 220 formed on the first substrate 210, a third insulating layer 230, a transmission electrode 240, and a reflection electrode 250. The array substrate 200 is divided into a reflection area RA and a transmission area TA. Although not shown in FIG. 8, a plurality of TFTs are formed on the first substrate 210. The third insulating layer 230 includes a photosensitive organic insulating layer, for example, a acryl resin, or the like.

The third insulating layer 230 covers the plurality of TFTs. The transmission area TA removes a corresponding area of the third insulating layer 230 and exposes the first substrate 210. The third insulating layer 230 has a substantially concavo-convex shape 233 on an upper surface. The concavo-convex shape 233 includes a convex portion 233a and a concave portion 233b.

The transmission electrode 240 may be a transparent conductive electrode. For example, the transparent conductive electrode may comprise indium tin oxide (ITO), indium zinc oxide (IZO), or the like. The transmission electrode is uniformly formed on the third insulating layer 230 and on the first substrate 210 where the third insulating layer 230 is removed. The reflection electrode 250 has a transmission window 251 partially exposing the transmission electrode 240. The reflection electrode 250 is uniformly formed on the transmission electrode 240. The transmission window 251 is formed at a position substantially corresponding to the transmission area TA.

A cell gap at the reflection area RA is different from a cell gap at the transmission area TA. More particularly, the distance between the color filter substrate 100 and array substrate 200 at the transmission area TA is approximately twice the distance between the color filter substrate 100 and array substrate 200 at the reflection area RA.

In FIG. 8, the cell gap at the reflection area RA is the distance between the common electrode 140 of the color filter substrate 100 and reflection electrode 250 of the array substrate 200. The cell gap at the transmission area TA is the distance between the common electrode 140 and transmission electrode 240.

The reflection electrode 250 is formed of a conductive metal. The reflective electrode 250 may be formed of a single layer having aluminum-neodymium (AlNd) or a double-layer having aluminum-neodymium (AlNd) and molybdenum-tungsten (Mo W).

Although not shown in FIG. 8, a contact hole (not shown) may be formed at the third insulating layer 230 to expose a drain electrode of the TFT (not shown). In case of forming the contact hole at the third insulating layer 230 the transmission electrode 240 and reflection electrode 250 are electrically connected to the drain electrode of the TFT through the contact hole. For example, by connecting the drain electrode to the reflection electrode and/or transmission electrode. Additionally, an additional TFT may be used in order to drive the reflection electrode and transmission electrode separately. Accordingly, a drain electrode of the first TFT may be connected to the reflection and a drain electrode of the second TFT may be connected to the reflection electrode.

The reflection electrode 250 formed at the reflection area RA reflects external light L1 coming through the color filter substrate 100 and controls the light L1 thereby displaying an image. Additionally, an internal light L2 is emitted from a light source (not shown) disposed at a rear portion of the array substrate 200 and through the transmission area TA. The internal light L2 passes through the transmission window 251 And is controlled to exit the color filter substrate 100, thereby displaying image.

The color filter substrate 100 includes the color filter 120, planarization layer 130, and common electrode 140. These are successively formed on the second substrate 110. The color filter 120 includes the R, G, and B color pixels having first, second, and third holes H1, H2 and H3, respectively. Those holes are formed on the R, G and B color pixels in the reflection area RA and partially exposing the second substrate 110.

The first, second, and third holes H1, H2, and H3, respectively, are formed by partially removing the color filter 120 in the reflection area RA. Thus, external light L1 input through the reflection area RA may partially exit without passing through the color filter 120, reducing the difference of the color reproducibility between the reflection area RA and transmission area TA.

The first hole H1 is bigger than the third hole H3. The second hole H2 is bigger than the first hole H1. Accordingly, in effective area, the G color pixel is smaller than the R color pixel and the R color pixel is smaller than the B color pixel. This reduces the difference of the color visibility between the R, G, and B color pixels.

Table 2 represents the white color coordinate of the color coordinate in accordance with the cell gap between the color filter substrate 100 and array substrate 200.

TABLE 2

| Reflection mode | | | Transmission mode | | |
| --- | --- | --- | --- | --- | --- |
| Cell gap | White-x | White-y | Cell gap | White-x | White-y |
| 1.6 | 0.300 | 0.323 | 3.3 | 0.300 | 0.327 |
| 1.9 | 0.322 | 0.356 | 3.6 | 0.312 | 0.342 |

As shown in Table 2, when the cell gap of 1.6 changes to a cell gap of 1.9 in the reflection mode the x and y coordinates of the white color are increased by about 0.022 and about 0.032, respectively. In the transmission mode when the cell gap of 3.3 is changed to a cell gap 3.6 the x and y coordinated of the white color increased by about 0.012 and about 0.015, respectively. The white color coordinate of the reflection mode is more sensitive to the cell gap change than the white color coordinate of the transmission mode even though variations of the cell gaps are the same. Thus, the planarization layer 130 has the double-layer structure so as to planarize the step difference between the second substrate 110 and color filter 120 at the reflection area RA.

The planarization layer 130 includes a first insulating layer 131 formed on the second substrate 110 through the holes H1, H2 and H3, and on the color filter 120. The second insulating layer 132 is formed on the first insulating layer 131. The planarization layer 130 may planarize the step difference between the second substrate 110 exposed through the holes H1, H2, and H3, and the color filter 120 adjacent to each of the holes H1, H2 and H3.

Thus, the reflection-transmission type LCD apparatus 400 may have a substantially uniform cell gap at the reflection area RA. Although the convex and concave portions 233a and 233b are formed at the array substrate 200 corresponding to the reflection area RA, the convex and concave portions 233a and 233b have a small size without affecting the cell gap at the reflection area RA. Accordingly, the cell gap at the reflection area RA may be substantially uniform.

The color filter substrate and the reflection-transmission type LCD apparatus include color pixels of different colors. Each of the color pixels has a hole and at least two color pixels have a different size of effective area.

Thus, the difference of color reproducibility between the transmission area and the reflection area and the difference of color visibility between the color pixels may be reduced, thereby improving display properties of the LCD apparatus. Also, the planarization layer may planarize the step difference between the substrate exposed through the hole and the color filter. Accordingly, the reflection-transmission type LCD apparatus may have the cell gap substantially uniform.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reflection-transmission LCD, comprising:
an element disposed relative to a color filter layer to substantially minimize differences in the color reproducibility between the reflection mode operation and the transmission mode operation, wherein the element comprises a hole formed in the color filter layer;
a reflection electrode disposed with a smaller cell gap to the color filter layer in a reflection area than a transmission electrode is disposed to the color filter layer in a transmission area;
a red (R), a green (G), and a blue (B) color filter formed in the color filter layer;
a first hole formed in the red (R) color filter;
a second hole formed in the green (G) color filter;
a third hole formed in the blue (B)color filter,
wherein the second hole is larger than the first hole.

2. The reflection-transmission LCD of claim 1, wherein the third hole is smaller than the second hole.

3. The reflection-transmission LCD of claim 1, wherein each of the red (R), green (G), and blue (B) color filters is divided into a first area and a second area arranged adjacent to each other and the first area does not contain the hole.

4. The reflection-transmission LCD of claim 3, wherein the second area of the red (R) color filter comprises two holes.

5. The reflection-transmission LCD of claim 4, wherein the second area of the green (G) color filter comprises two holes.

6. The reflection-transmission LCD of claim 4, wherein the second area corresponding to the blue (B) color filter comprises one hole.

7. The reflection-transmission LCD of claim 6, wherein the first area is a transmission area and the second area is a reflection area.

8. The reflection-transmission LCD of claim 1, the element further comprising a planarization layer formed over the color filter layer and extending into the hole formed in the color filter layer.

9. The reflection-transmission LCD of claim 1, the element further comprising a planarization layer formed over the color filter layer for leveling a thinner portion of color filter layer in a reflection area with a thicker portion of color filter layer in a transmission area.

10. A reflection-transmission LCD, comprising:
a first substrate and a second substrate arranged opposite the first substrate;
a red (R), green (G) blue (B) color filter on the first substrate;
a planarization layer formed on the first substrate;
at least one hole formed in the color filter layer to substantially minimize difference in color reproducibility between reflection mode operation and transmission mode operation; and
a reflection electrode disposed with a smaller cell gap to the color layer in a reflection area than a transmission electrode is disposed to the color filler layer in a transmission area,
wherein two holes are formed in a red (R) portion of the color filter layer, two holes are formed in a green (G) portion of the color filter layer, and one hole is formed in a blue (B) portion of the color filter layer.

11. The reflection-transmission LCD of claim 10, wherein the planarization layer comprises a first insulatng layer formed on the color filter layer and covers the at least one hole.

12. The reflection-transmission LCL of claim 11, wherein the planarization layer further comprises a second insulating layer formed on the first insulating layer for substantially planarizing step differences due to the at least one hole formed in the color filter layer.

13. A reflection-transmission LCD, comprising:
a plurality of substrates arranged opposite to each other;
a color filter layer formed on at least one of the plurality of substrates,
wherein the color filter layer comprises an element disposed to substantially minimize differences in color reproducibility between reflection mode operation and transmission mode operation; and
a reflection electrode disposed with a smaller cell gap to the color filter layer in a reflection area than a transmission electrode is disposed to the color filter layer in a transmission area,
wherein two holes are formed in a red (R) portion of the color filter layer, two holes are formed in a green (G) portion of the color filter layer, and one hole is formed in a blue (B) portion of the color filter layer.

* * * * *